US009008574B2

(12) United States Patent
Frankland et al.

(10) Patent No.: US 9,008,574 B2
(45) Date of Patent: Apr. 14, 2015

(54) FOCUSED ANTENNA, MULTI-PURPOSE ANTENNA, AND METHODS RELATED THERETO

(75) Inventors: Stephen Frankland, Horsham (GB); John Hillan, Alton (GB)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 12/852,080

(22) Filed: Aug. 6, 2010

(65) Prior Publication Data

US 2011/0065383 A1 Mar. 17, 2011

Related U.S. Application Data

(60) Provisional application No. 61/242,295, filed on Sep. 14, 2009, provisional application No. 61/242,275, filed on Sep. 14, 2009.

(51) Int. Cl.

| | |
|---|---|
| ***H04B 5/00*** | (2006.01) |
| ***H01Q 1/24*** | (2006.01) |
| ***H01Q 7/00*** | (2006.01) |

(52) U.S. Cl.

CPC . *H01Q 1/243* (2013.01); *H01Q 7/00* (2013.01)

(58) Field of Classification Search

USPC ........................................................ 455/41.1

See application file for complete search history.

(56) References Cited

U.S. PATENT DOCUMENTS

| | | | |
|---|---|---|---|
| 6,201,387 B1 | 3/2001 | Govari | |
| 6,407,665 B2 * | 6/2002 | Maloney | 340/568.1 |
| 6,906,667 B1 | 6/2005 | Poilasne et al. | |
| 7,769,345 B2 | 8/2010 | Johnson et al. | |
| 2004/0088012 A1 | 5/2004 | Kroll et al. | |
| 2005/0017677 A1 | 1/2005 | Burton et al. | |
| 2005/0231433 A1 | 10/2005 | Nantz et al. | |
| 2006/0061325 A1 | 3/2006 | Tang et al. | |
| 2006/0132352 A1 | 6/2006 | Schantz et al. | |
| 2006/0158152 A1 * | 7/2006 | Taniguchi et al. | 320/106 |
| 2006/0160487 A1 * | 7/2006 | Nam et al. | 455/41.1 |
| 2007/0004456 A1 | 1/2007 | Shimada | |
| 2007/0008140 A1 * | 1/2007 | Saarisalo et al. | 340/572.7 |
| 2007/0024509 A1 | 2/2007 | Lee | |
| 2007/0126650 A1 | 6/2007 | Guenther | |
| 2007/0176833 A1 | 8/2007 | Haho et al. | |

(Continued)

FOREIGN PATENT DOCUMENTS

| | | |
|---|---|---|
| EP | 2337323 A1 | 6/2011 |
| JP | H11122146 A | 4/1999 |

(Continued)

OTHER PUBLICATIONS

Written Opinion—PCT/US2010/048816, ISA/EPO—Aug. 31, 2011.

(Continued)

*Primary Examiner* — Fayyaz Alam
*Assistant Examiner* — Mohammed Rachedine
(74) *Attorney, Agent, or Firm* — Knobbe Martens Olson & Bear LLP

(57) ABSTRACT

Exemplary embodiments are directed to a device including a focused antenna. A device may include a minor plane surface and an antenna positioned proximate the minor plane surface. The antenna may be configured for generating a field focused around the minor plane surface. The antenna may further include an element extending from the minor plane surface toward another minor plane surface of the device.

21 Claims, 11 Drawing Sheets

(56) References Cited

U.S. PATENT DOCUMENTS

| | | | | |
|---|---|---|---|---|
| 2008/0164978 | A1* | 7/2008 | Tanada | 340/10.1 |
| 2008/0245851 | A1* | 10/2008 | Kowalski | 235/375 |
| 2008/0252416 | A1 | 10/2008 | Posch et al. | |
| 2008/0272889 | A1 | 11/2008 | Symons | |
| 2008/0311957 | A1 | 12/2008 | Jantunen et al. | |
| 2009/0001930 | A1 | 1/2009 | Pohjonen | |
| 2009/0239591 | A1 | 9/2009 | Alameh et al. | |
| 2010/0093277 | A1 | 4/2010 | Bloebaum et al. | |
| 2010/0190537 | A1 | 7/2010 | Fujii | |
| 2011/0070825 | A1 | 3/2011 | Griffin et al. | |
| 2011/0070828 | A1 | 3/2011 | Griffin et al. | |
| 2011/0070834 | A1 | 3/2011 | Griffin et al. | |
| 2013/0109310 | A1 | 5/2013 | Mine et al. | |
| 2013/0281014 | A1 | 10/2013 | Frankland et al. | |
| 2014/0128032 | A1 | 5/2014 | Muthukumar | |

FOREIGN PATENT DOCUMENTS

| | | | |
|---|---|---|---|
| JP | 2002123619 | A | 4/2002 |
| JP | 2002209343 | A | 7/2002 |
| JP | 2006004015 | A | 1/2006 |
| JP | 2006201959 | A | 8/2006 |
| JP | 2008206297 | A | 9/2008 |
| JP | 5013111 | B2 | 8/2012 |
| WO | WO2006096685 | A1 | 9/2006 |
| WO | 2008039559 | A1 | 4/2008 |

OTHER PUBLICATIONS

International Search Report and Written Opinion—PCT/US2010/048816—International Search Authority, European Patent Office, Jan. 25, 2011.

* cited by examiner

FOCUSED ANTENNA, MULTI-PURPOSE ANTENNA, AND METHODS RELATED THERETO

CLAIM OF PRIORITY UNDER 35 U.S.C. §119

This application claims priority under 35 U.S.C. §119(e) to:

U.S. Provisional Patent Application 61/242,295 entitled "FOCUSED ANTENNA FOR TOUCH OPERATIONS IN A HANDHELD DEVICE" filed on Sep. 14, 2009, the disclosure of which is hereby incorporated by reference in its entirety; and U.S. Provisional Patent Application 61/242,275 entitled "COMBINED WIDE AREA AND FOCUSED ANTENNA FOR NFC AND WIRELESS POWER" filed on Sep. 14, 2009, the disclosure of which is hereby incorporated by reference in its entirety.

BACKGROUND

1. Field

The present invention relates generally to near-field communication and wireless power, and more specifically, to an antenna configured to generate a focused field and a multi-purpose antenna including at least one element for generating a focused field and another element configured for receiving wireless power.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, electronic devices may be configured to transmit and/or receive data via near-field communication (NFC). For example, a device may be configured to communicate with an electronic reader, such as an "Oyster Card" reader. Via NFC, an electronic device may make a payment, gain access through a barrier, or a combination thereof.

With existing antennas and placement thereof within an electronic device, in order to communicate with another device, such as a reader, a user may have to hold the electronic device by its edges or back surface, which is unnatural and may increase the risk of dropping the electronic device. In addition, existing approaches use larger coil antennas that may require that their axis point up and down (i.e., toward a back and front surface of an associated electronic device) as the electronic device is held naturally in a hand of a user.

A need exists for an electronic device having an antenna positioned therein to enable for enhanced user experience. More specifically, a need exists for an electronic device having an antenna suitably position to enable a user to hold the electronic device in a natural position while enabling the electronic device to communicate via NFC with another device. Further, a need exists for an electronic device having an antenna that is adequately positioned for NFC and configured to receive wireless power, transmit wireless power, or both.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
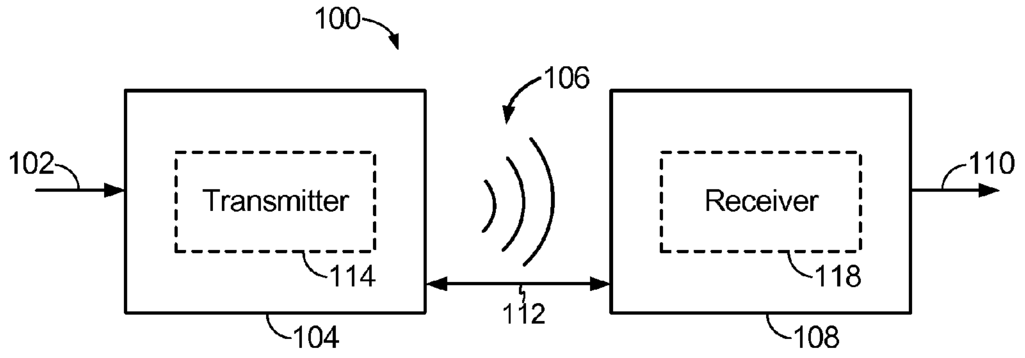
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
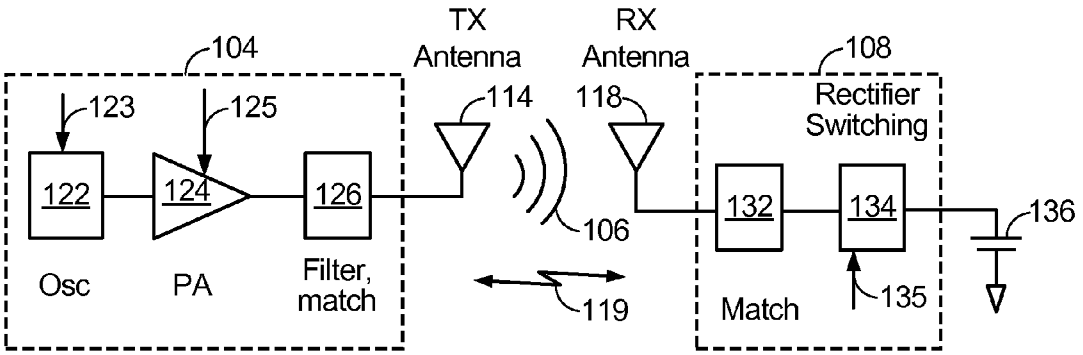
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3A:
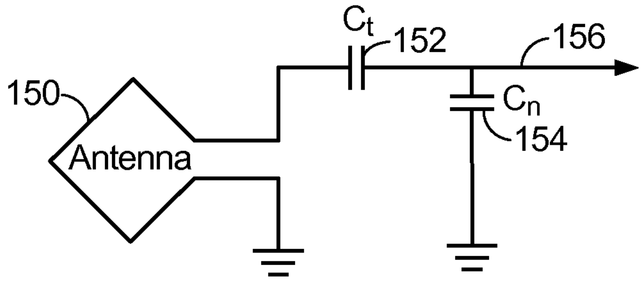
FIG. 3A illustrates a schematic diagram of a loop antenna for use in exemplary embodiments of the present invention.

As illustrated in FIG. 3A, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 3B:
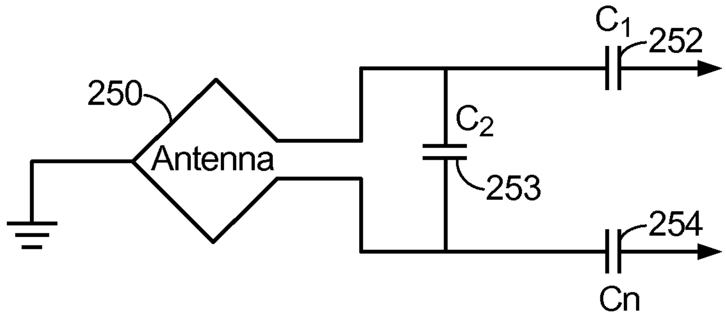
FIG. 3B illustrates an alternate embodiment of a differential antenna used in exemplary embodiments of the present invention.

FIG. 3B illustrates an alternate embodiment of a differential antenna 250 used in exemplary embodiments of the present invention. Antenna 250 may be configured as a differential coil antenna. In a differential antenna configuration, the center of antenna 250 is connected to ground. Each end of antenna 250 are connected into a receiver/transmitter unit (not shown), rather than having one end connected to ground as in FIG. 3A. Capacitors 252, 253, 254 may be added to the antenna 250 to create a resonant circuit that generates a differential resonant signal. A differential antenna configuration may be useful in situations when communication is bidirectional and transmission into the coil is required. One such situation may be for Near Field Communication (NFC) systems.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, “electric” antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
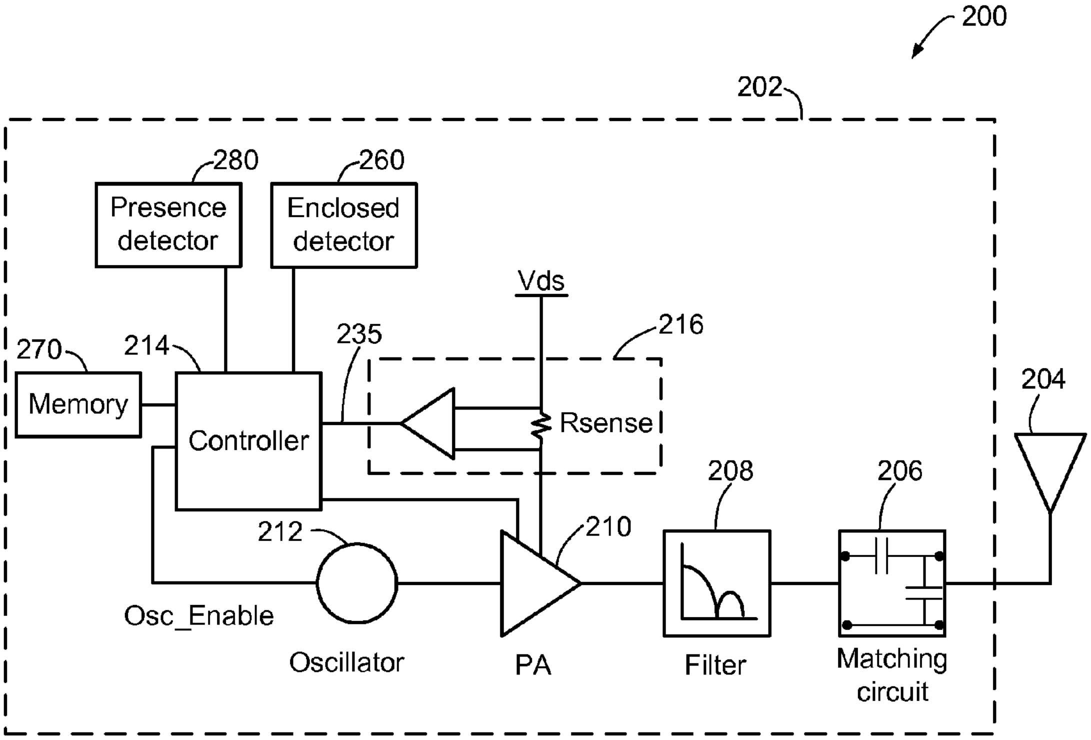
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need “turns” in order to be of a practical dimension. An exemplary implementation of a transmit antenna 204 may be “electrically small” (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
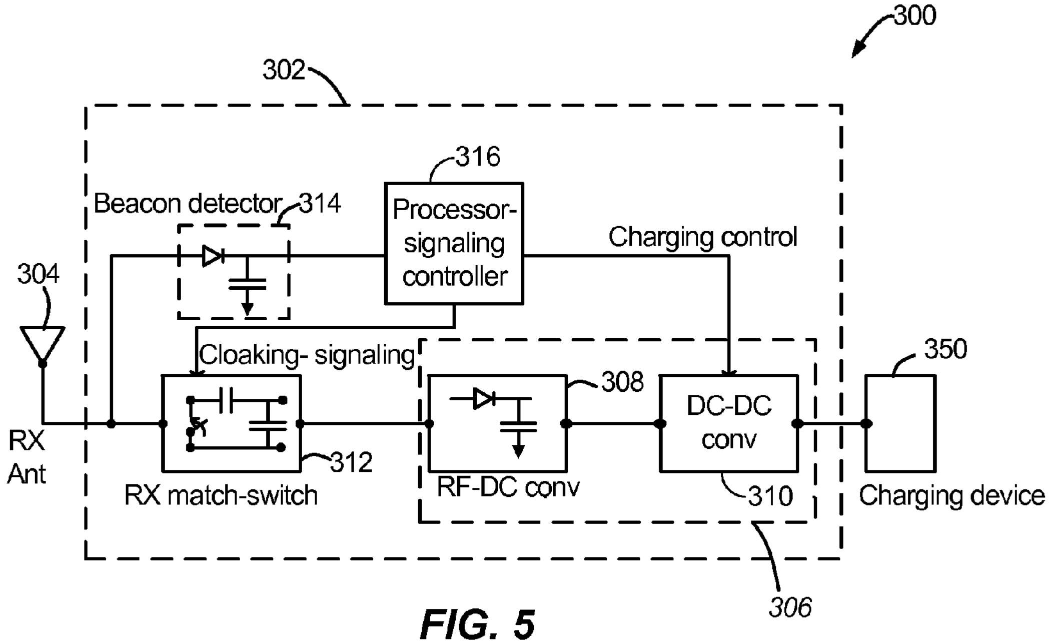
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
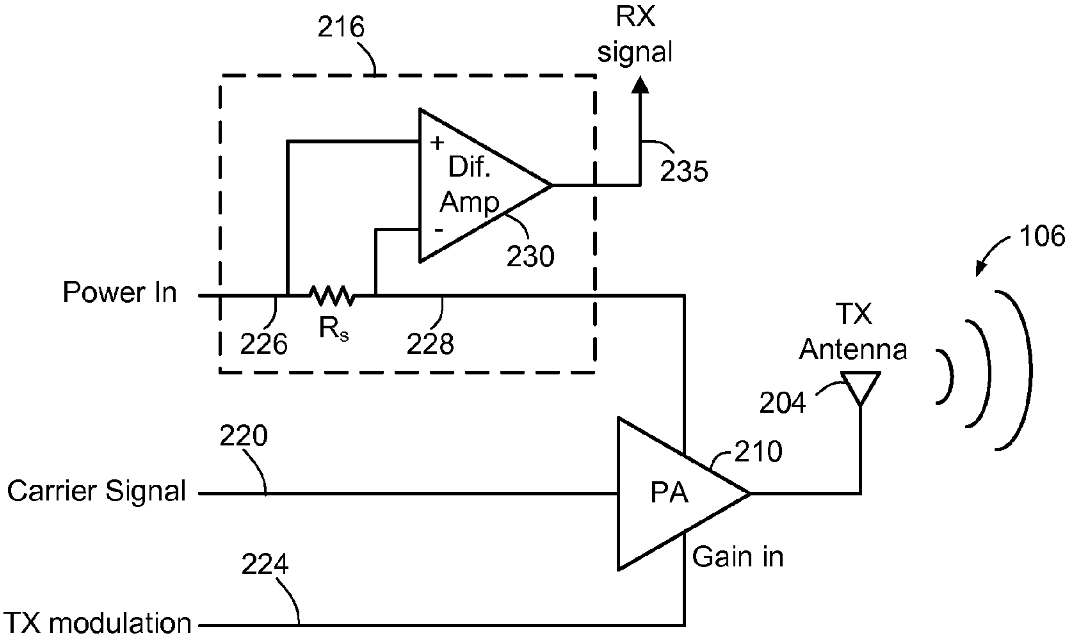
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

As noted above, electronic devices may be configured for near-field communication (NFC) and, according to one example, an electronic device may be configured to may make a payment, gain access through a barrier, or both, via NFC means. As will also be understood by a person having ordinary skill in the art, NFC between electronic devices may require the devices to be positioned within a short distance (e.g., 1-2 cm) of one another. Accordingly, a "touch operation" or a "tapping operation" (i.e., the electronic devices touch one another or are tapped together) may be required to perform NFC.

Exemplary embodiments of the invention relate to an electronic device having at least one antenna, which is positioned and configured to communicate with at least one other device (e.g., an electronic reader) via, for example, NFC. More specifically, various exemplary embodiments relate to an electronic device having at least one antenna, wherein the at least one antenna is positioned in the electronic device to enable an associated user to adequately position the electronic device and, more specifically, the at least one antenna, proximate another device, for communication therewith, in a natural, safe, and/or easy manner. The at least one antenna may be well suited to the ergonomic needs of supporting touch operations, such as NFC payments in a handheld device. Other exemplary embodiments of the invention relate to an antenna configured for NFC operations (e.g., touch operations) and wireless charging.

Figure 7:
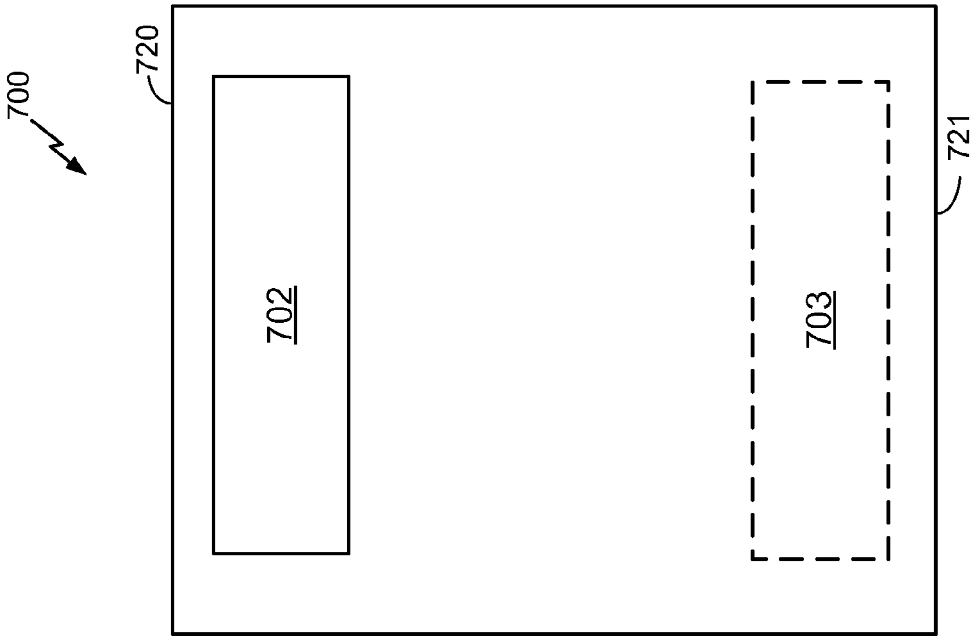
FIG. 7 illustrates a block diagram of an electronic device including an antenna, according to an exemplary embodiment of the present invention.

FIG. 7 illustrates a block diagram of an electronic device 700 including at least one antenna 702. Electronic device 700 may include any known electronic device, such as a mobile telephone. According to one exemplary embodiment of the present invention, antenna 702 may comprise a coil with one or more windings. Moreover, antenna 702 may comprise a helical shape, a spiral shape, or any other known and suitable shape. Furthermore, antenna 702, which is configured for near-field communication (NFC), may be positioned proximate a minor plane surface 720 of electronic device 700. Furthermore, electronic device 700 may include another antenna 703 positioned proximate another minor plane surface 721 of electronic device 700. It is noted that each of antenna 702 and antenna 703 may be referred to herein as a "focused area coil."

Figure 8:
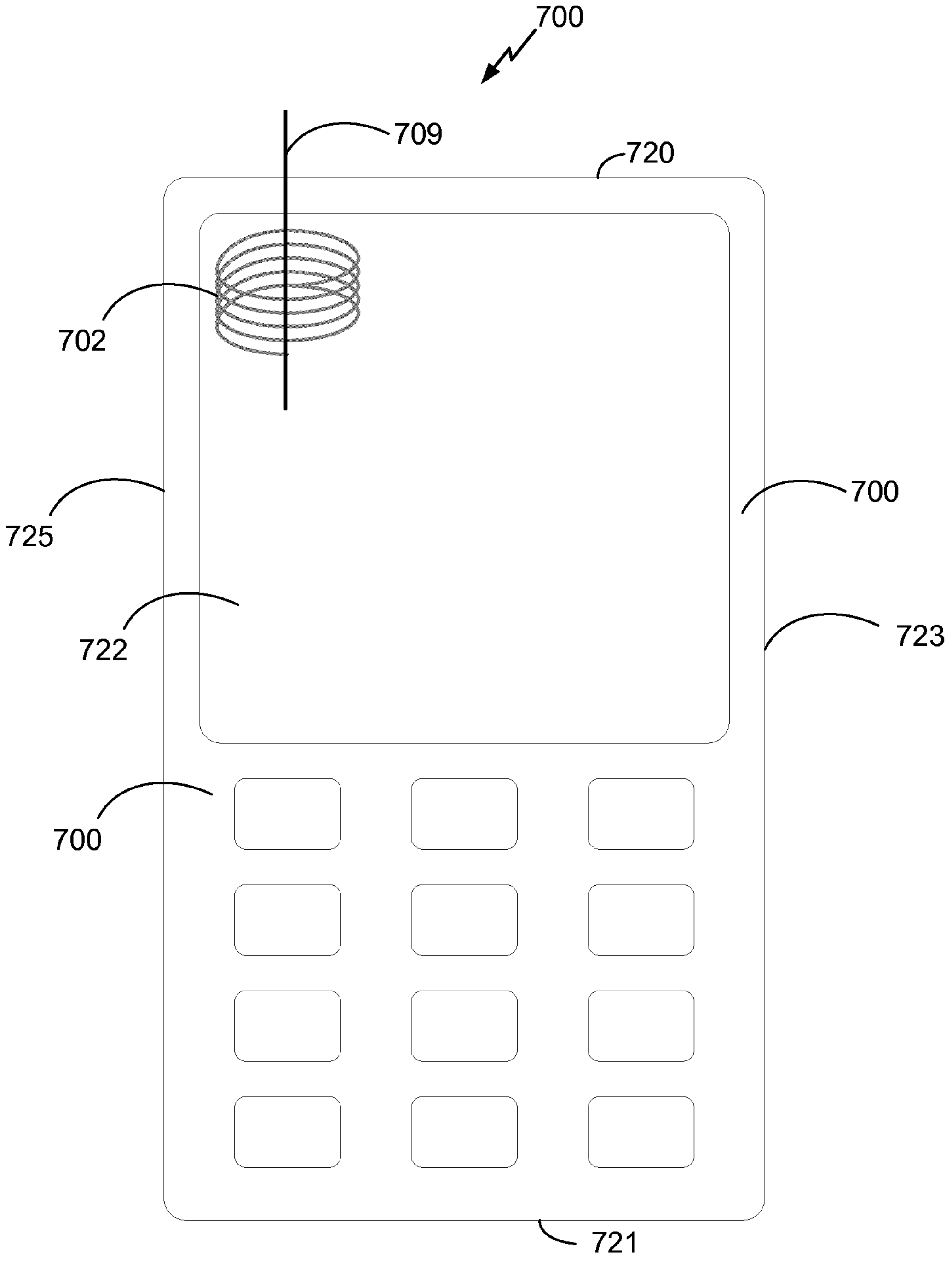
FIG. 8 illustrates an electronic device including an antenna positioned proximate another electronic device, in accordance with an exemplary embodiment of the present invention.

With reference to FIG. 8, another illustration of electronic device 700 is provided. As illustrated in FIG. 8, electronic device 700 may include first minor plane surface 720 and second minor plane surface 721, which is opposite to and substantially parallel with first minor plane surface. Further, electronic device 700 includes a first major plane surface 723 and a second major plane surface that is opposite to and substantially parallel with first major plane surface 725. Electronic device 700 may also include an output device 722, which may comprise, for example, a display. Electronic device 700 may further include an input device 724, which may comprise, for example, a keyboard.

Furthermore, antenna 702 is illustrated as being positioned proximate a minor plane surface (i.e., surface 720) of electronic device 700. It is noted that although an antenna (i.e., antenna 702) is depicted as being positioned proximate minor plane surface 720, an antenna may also, or alternatively, be positioned proximate minor plane surface 721. According to one exemplary embodiment, each of minor plane surface 720 and minor plane surface 721 may have an antenna positioned proximate thereto. It is further noted that although antenna 702 appears to be depicted in output device 722, antenna 702 is not visible through output device 722 but, rather, antenna 702 is illustrated in FIG. 8 to depict a position of antenna 702 relative to minor plane surface 720. In an exemplary embodiment, antenna 702 may include a coil centered around an axis 709, which extends outward from minor plane surface 720. It is noted that, given a sufficient number of windings turns, antenna 702 may be suitable for NFC, whilst being sufficiently small to be positioned within a handheld device, such as a mobile telephone.

As configured, antenna 702 may produce a localized magnetic field near minor plane surface 720. Accordingly, in comparison to prior art configurations, a magnetic field generated from antenna 702 may be intensified near minor plane surface 720. Stated another way, in contrast to antennas that may be more widely distributed within an electronic device and, thus, may generate a magnetic field that is more widely spread, antenna 702 may provide a magnetic field which is focused and localized around minor plane surface 720. It is noted that the focused field may comprise a non-optically focused field.

Figure 9:
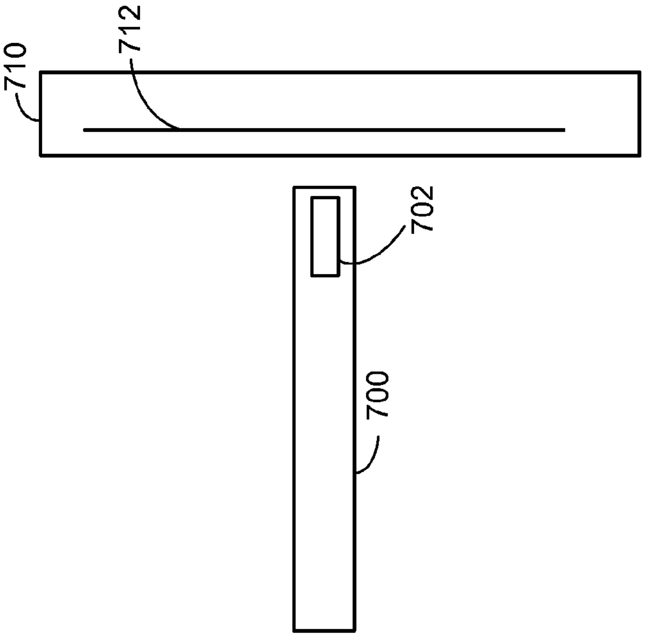
FIG. 9 is another illustration of an electronic device including an antenna, in accordance with an exemplary embodiment of the present invention.
Figure 10:
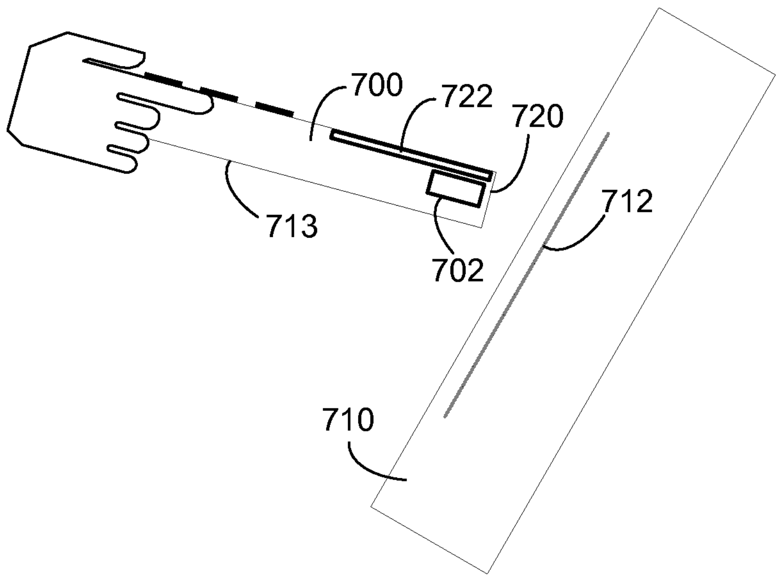
FIG. 10 is another illustration of an electronic device including an antenna positioned proximate another electronic device, according to an exemplary embodiment of the present invention.

FIG. 9 depicts electronic device 700 positioned proximate a device 710, which may comprise, for example, an electronic reader. By way of example only, device 710, which may comprises an antenna 712, may include a point-of-sale terminal, a pass gate (e.g., into a mass transit system), a smart poster, or a combination thereof. FIG. 10 is another illustration of electronic device 700 and, more specifically, antenna 702 being positioned proximate device 710. FIG. 10 illustrates how antenna 702 of electronic device 700 may be easily positioned near device 710 while being held in a conventional manner. Stated another way, because antenna 702 is positioned proximate a minor plane surface (e.g., minor plane surface 720), a device user, who may hold electronic device 700 across a back surface 713 and at least one major plane surface of electronic device 700, may easily position the minor plane surface having antenna proximate thereto, adjacent to, and possibly in contact with, device 710. Accordingly, a "touch" or a "tapping" operation may be performed more easily in comparison to an electronic device having an antenna that is not configured to generate a field, which is focused near a minor plane surface.

Therefore, in contrast to prior art configurations, which may require a user to awkwardly position a back or front surface of an electronic device adjacent to another device (e.g., an NFC reader), the exemplary embodiments described herein may enable a user to perform one or more operations (e.g., pay at a point-of-sale terminal, verification to open a pass gate into mass transit systems, or read a tag embedded in a smart poster) while holding electronic device 700 in a conventional, natural manner. Stated another way, a device user may hold electronic device 700 in a conventional manner while performing one or more operations, such as paying at a point-of-sale terminal, providing verification at a pass gate, reading a tag embedded in a smart poster, and many others. It is noted that a position of antenna 702, and possibly antenna 703, may be known to a device user.

According to another exemplary embodiment, antenna 702 may comprise, or may be adjacent to, a suitable magnetic material, which may enhance performance of antenna 702. It is noted that in an exemplary embodiment wherein antenna 702, components adjacent thereto (e.g., fasteners), or both, comprise a suitable magnetic material, the cost and/or the weight of an associated electronic device may not be increased.

Figure 11:
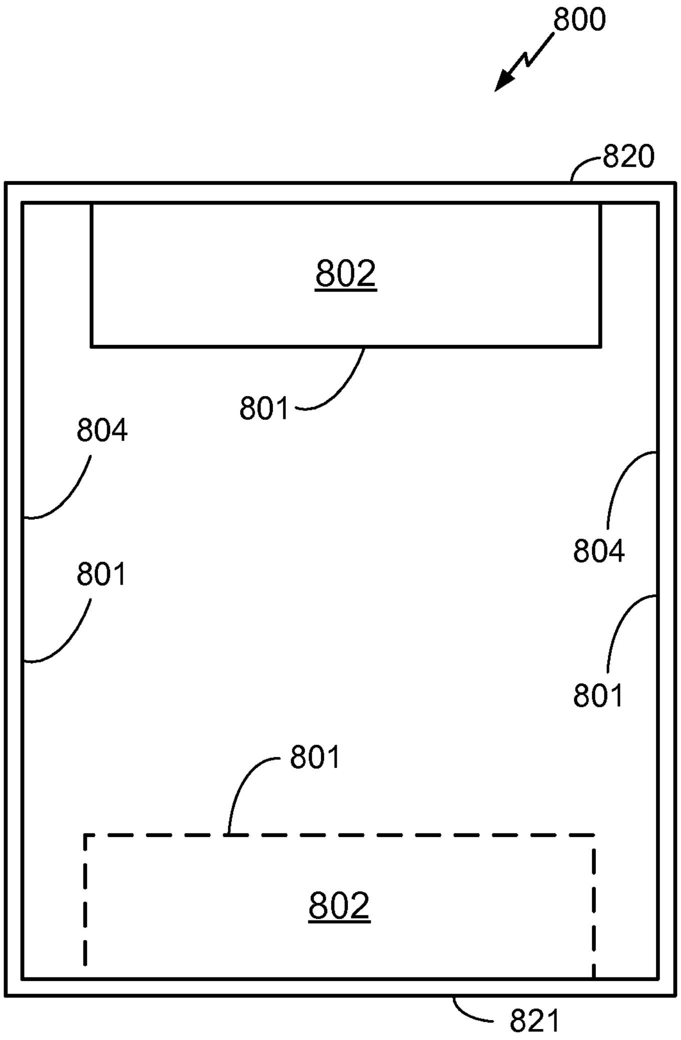
FIG. 11 illustrates a block diagram of another electronic device including an antenna, according to an exemplary embodiment of the present invention.

FIG. 11 illustrates a block diagram of another electronic device 800, in accordance with an exemplary embodiment of the present. Electronic device 800 may include any know electronic device, such as a mobile telephone. According to one exemplary embodiment of the present invention, electronic device 800 may include an antenna 801 including a one or more elements 802 positioned proximate a first minor plane surface 820. Moreover, antenna 801 may include a second element 804 including a loop extending from first minor plane surface 820 toward a second minor plane surface 821, which is opposite first minor surface 820. Furthermore, antenna 801 may include one or more elements 802 positioned proximate second minor plane surface 821.

Figure 12:
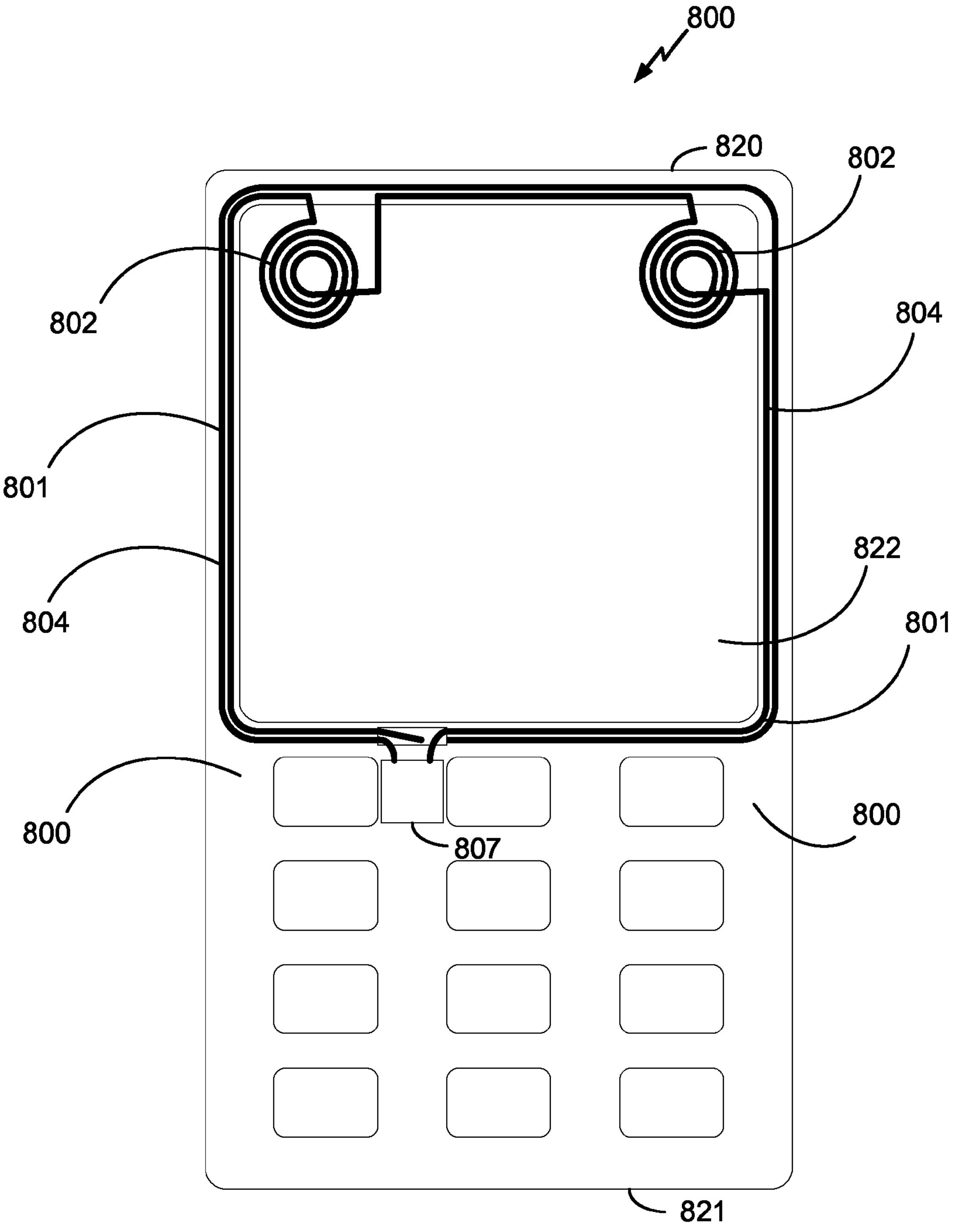
FIG. 12 illustrates an electronic device including an antenna configured for near-field communication and wireless power transmission and reception, according to an exemplary embodiment of the present invention.

FIG. 12 is another illustration of electronic device 800 having an output device 822, which may comprise a display, and an input device 824, which may comprise a keyboard. Moreover, according to an exemplary embodiment of the present invention, electronic device 800 includes antenna 801, which, as described above, may comprise one or more elements 802 and another element 804. Each element 802 may comprise a coil having one or more windings. As illustrated in FIG. 12, each element 802 may be spaced from every other element 802. It is noted that each element 802 may be referred to herein as a "focused area coil." It is noted that the number or elements 802 may be chosen to suit space, cost, and performance requirements. Furthermore, element 804 may comprise a one or more coils, which may be larger than the coils associated with elements 802. Element 804 may also be referred to herein as a "wide area coil." As illustrated in FIG. 12, according to one exemplary embodiment, element 804 may comprise a coil that is positioned proximate to and around output device 822. Electronic device 800 may also comprise a transceiver 807 coupled to and configured for receiving wireless power, data, or both, from antenna 802.

It is noted that, in contrast to prior art configurations that may include a plurality of antennas, the one or more elements 802 and element 804 may form a single, multi-purpose antenna. More specifically, the one or more elements 802, which are positioned proximate a minor plane surface electronic device 800, may be suitable for one or more operations (e.g., paying at a point-of-sale terminal, providing verification to open a pass gate into mass transit systems, or reading a tag embedded in a smart poster), similar to antenna 702 described above with reference to FIGS. 7-10. Moreover, element 804 may be configured to receive wireless power.

Although the one or more elements 802 may be suitable for NFC and element 804 may be suitable for receiving wireless power, the embodiments of the present invention are not so limited. Rather, element 802 may also be utilized for wireless power purposes and element 804 may be utilized for communication purposes. By way of example only, element 804 may be suitable for communication with a horizontal readers, such as an "Oyster Card" terminal on the London Underground.

In contrast to prior art configurations, which may require a user to awkwardly position a back or front surface of an electronic device adjacent to an NFC reader, the exemplary embodiments described herein may enable a user to perform one or more NFC operations (e.g., making a payment, providing verification, or reading a tag) while holding electronic device 800 in a conventional, natural manner. Stated another way, a device user may hold electronic device 800 in a conventional manner while performing one or more operations, such as paying at a point-of-sale terminal, providing verification at a pass gate, reading a tag embedded in a smart poster, and many others. It is noted that a position of elements 802 may be known to a device user.

Figure 13:
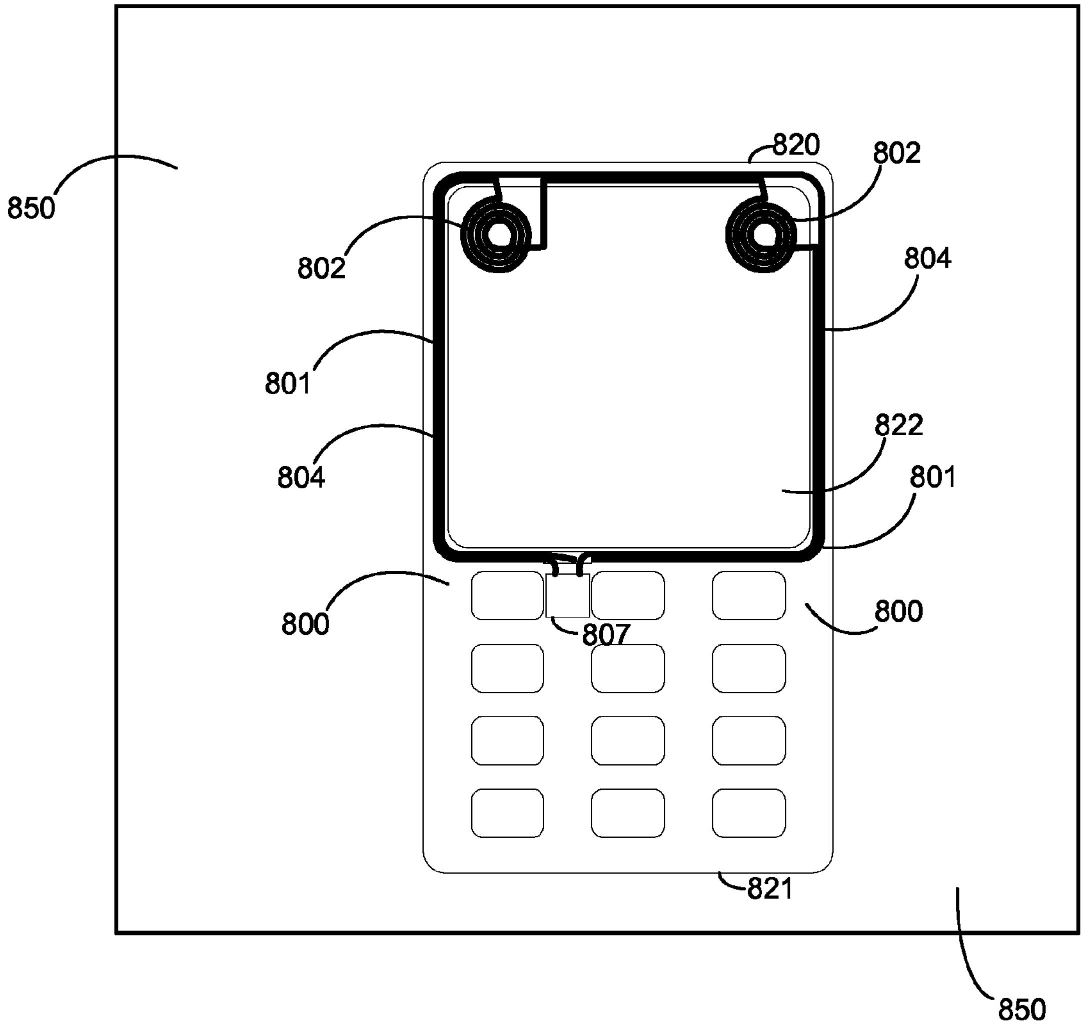
FIG. 13 illustrates the electronic device of FIG. 12 positioned within a wireless charging region of a wireless power device, according to an exemplary embodiment of the present invention.

FIG. 13 illustrates electronic device 800 positioned proximate a wireless power device 850, which may comprise at least one transmitter (not shown in FIG. 12; see e.g., transmitter 200 of FIG. 4) having at least one transmit antenna (e.g., transmit antenna 204 of FIG. 4). As will be appreciated by a person having ordinary skill in the art, wireless power device 850 may be configured to wirelessly transfer power to an electronic device (e.g., electronic device 800) positioned within an associated charging region. According to one exemplary embodiment, at least element 804 of antenna 802 may wirelessly receiver power from wireless power device 850.

Figure 14:
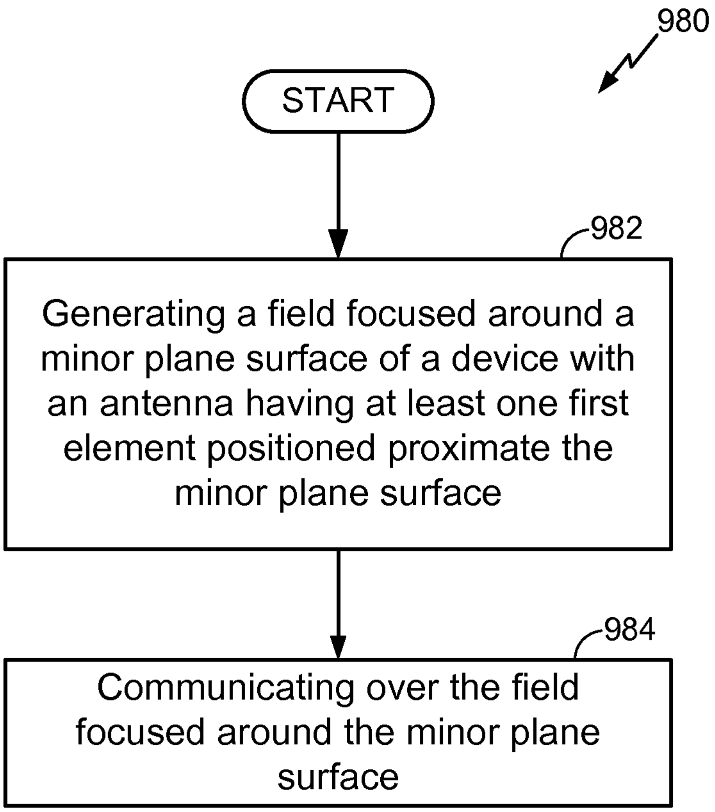
FIG. 14 is a flowchart illustrating a method, according to an exemplary embodiment of the present invention.

FIG. 14 is a flowchart illustrating a method 980, in accordance with one or more exemplary embodiments. Method 980 may include generating a field focused around a minor plane surface of a device with an antenna having at least one first element positioned proximate the minor plane surface (depicted by numeral 982). Method 980 may further include communicating over the field focused around the minor plane surface (depicted by numeral 984).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device configured to wirelessly receive charging power, comprising:

a coil configured to generate a magnetic field with an intensity level at a center of an upper or a lower first device edge that is greater than an intensity level of the magnetic field at a center of a second device edge, a center of a third device edge and a center of a fourth device edge, the coil being further configured to wirelessly communicate with an external device substantially through the first device edge using the magnetic field at the first device edge, the coil centered around a first axis;

a loop antenna electrically connected to the coil and centered around a second axis different than the first axis, the loop antenna configured to wirelessly receive charging power via a wireless field, a portion of the loop antenna at least partially enclosing the coil; and a battery electrically connected to and configured to be charged with charging power received from the loop antenna.

2. The device of claim 1, wherein the first device edge is positioned closer to the external device than a distance between each of the second device edge, the third device edge and the fourth device edge and the external device.

3. The device of claim 1, the coil comprising a plurality of coils.

4. The device of claim 1, the coil coplanar with the loop antenna.

5. The device of claim 4, the coil configured to communicate via near-field communication (NFC).

6. The device of claim 1, the coil and the loop antenna forming an integrated antenna.

7. The device of claim 1, the coil configured to operate over a first area, and the loop antenna configured to operate over a second area greater than the first area.

8. A method of wirelessly receiving charging power, comprising:

generating a magnetic field with an intensity level at a center of an upper or a lower first device edge that is greater than an intensity level of the magnetic field at a center of a second device edge, a center of a third device edge and a center of a fourth device edge;

wirelessly communicating with an external device substantially through the first device edge using the magnetic field at the first device edge, via a coil centered around a first axis;

receiving charging power via a wireless field at a loop antenna electrically connected to the coil, the loop antenna centered around a second axis different than the first axis, a portion of the loop antenna at least partially enclosing the coil; and charging a battery with charging power received from loop antenna, the battery electrically connected to the coil.

9. The method of claim 8, wherein the first device edge is positioned closer to the external device than a distance between each of the second device edge, the third device edge and the fourth device edge and the external device.

10. The method of claim 8, the coil comprising a plurality of coils.

11. The method of claim 8, the coil coplanar with the loop antenna.

12. The method of claim 11, wherein the coil is further configured to receive near-field communication (NFC).

13. The method of claim 8, the coil and the loop antenna forming an integrated antenna.

14. The method of claim 8, wherein:

the coil is further configured to wirelessly communicate over a first area , and the receiving charging power at the loop antenna comprises receiving power over a second area greater than the first area.

15. An apparatus for wirelessly receiving charging power, comprising:

means for generating a magnetic field with an intensity level at a center of an upper or a lower first device edge that is greater than an intensity level of the magnetic field at a center of a second device edge, a center of a third device edge and a center of a fourth device edge, the means for generating a magnetic field being further configured to wirelessly communicate with an external device substantially through the first device edge using the magnetic field at the first device edge, the means for generating a magnetic field centered around a first axis;

means for receiving charging power via a wireless field, the means for receiving charging power centered around a second axis different than the first axis, a portion of the means for receiving charging power at least partially enclosing the means for generating a magnetic field; and means for charging a battery with charging power received from the means for receiving power.

16. The apparatus of claim 15, wherein the first device edge is positioned closer to the external device than a distance between each of the second device edge, the third device edge and the fourth device edge and the external device.

17. The apparatus of claim 15, the means for generating a magnetic field comprising a plurality of means for wireless communication.

18. The apparatus of claim 15, the means for generating a magnetic field coplanar with the means for receiving charging power via a wireless field.

19. The apparatus of claim 18, the means for generating a Magnetic field comprising means for near-field communication (NFC).

20. The apparatus of claim 15, the means for generating a magnetic field and the means for receiving power forming an integrated means both for wireless communication and receiving charging power.

21. The apparatus of claim 15, the means for generating a magnetic field comprising means for operating over a first area, and the means for receiving power comprising means for operating over a second area greater than the first area.

* * * * *